United States Patent
Gillis

(10) Patent No.: US 6,279,208 B1
(45) Date of Patent: Aug. 28, 2001

(54) CLIP FOR POLE OR CABLE

(76) Inventor: Robert Gillis, 224 W. O'Connor St., Menlo Park, CA (US) 94025

(*) Notice: Subject to any disclaimer, the term of this patent is extended or adjusted under 35 U.S.C. 154(b) by 0 days.

(21) Appl. No.: 09/496,299

(22) Filed: Feb. 1, 2000

(51) Int. Cl.$^7$ .............................. F16B 45/02; F16G 17/00; A44B 13/00
(52) U.S. Cl. .......................... 24/343; 24/598.9; 24/265 H
(58) Field of Search .................. 24/343, 265 H, 24/265 EC, 598.7, 598.9, 599.3, 599.4, 599.5, 600.7, 600.8, 601.5, 601.6; 294/82.19, 82.2

(56) References Cited

U.S. PATENT DOCUMENTS

| | | | |
|---|---|---|---|
| 546,226 | * 9/1895 | Cook | 24/589.9 X |
| 737,790 | * 9/1903 | Steele | 24/598.9 X |
| 948,354 | * 2/1910 | Tappan | 24/598.9 X |
| 3,314,630 | 4/1967 | Lewis, Sr. . | |
| 3,749,107 | 7/1973 | Laberge . | |
| 3,834,410 | 9/1974 | Gillis . | |
| 3,863,659 | 2/1975 | Gillis . | |
| 3,986,519 | 10/1976 | Gillis . | |
| 4,099,533 | 7/1978 | Gillis . | |
| 4,175,305 | 11/1979 | Gillis . | |
| 4,265,259 | 5/1981 | Gillis . | |
| 4,265,260 | 5/1981 | Gillis . | |
| 4,308,647 | 1/1982 | Gillis . | |
| 4,414,993 | 11/1983 | Gillis . | |
| 4,706,696 | 11/1987 | Gillis . | |
| 4,809,726 | 3/1989 | Gillis . | |
| 4,944,322 | 7/1990 | Gillis . | |
| 5,642,750 | 7/1997 | Brown . | |

FOREIGN PATENT DOCUMENTS

DT 2521913 11/1976 (DE).
1103575 5/1965 (GB).

* cited by examiner

*Primary Examiner*—Robert J. Sandy
(74) *Attorney, Agent, or Firm*—Townsend and Townsend and Crew LLP

(57) ABSTRACT

A clip is disclosed for securing an object such as a tent fabric to an elongate support such as a pole or cable in a manner does not slide along the support but that can be easily engaged and disengaged. The clip includes a hook and a cam-shaped clamp that is manually rotated between an open position in which the cam surface of the clamp is retracted sufficiently to allow easy insertion of the pole or cable, and a clamping position in which the cam surface presses the pole or cable against the interior of the hook.

21 Claims, 5 Drawing Sheets

CLIP FOR POLE OR CABLE

BACKGROUND OF THE INVENTION

This invention relates to structures that utilize poles, rods, or cables for support, and addresses the need to quickly attach an object to such a support in a secure, non-sliding manner while also being able to quickly disconnect the object for purposes of dismantling the structure.

Tents and canopies are frequently designed to be erected on a non-permanent basis for events such as outdoor parties and receptions, circuses, revival meetings, political fundraisers, booths at fairs and festivals, and the like, and after use to be dismantled and removed for storage and re-use. In these structures, canvas or other fabric is secured to a pole or a framework of poles, and the efficient erection and dismantling of these structures requires ease of assembly and disassembly while still providing a secure attachment of the parts when assembled. In some structures, cables or other types of flexible or semi-flexible support lines are used in place of rigid poles, but they are still needed for structural support and they are of limited usefulness when the attachment is not secure and is not capable of quick assembly and disassembly. Banners and flags are similarly used in conjunction with pole or cable supports, and although they have somewhat less of a need for quick assembly and disassembly, they would still benefit from a more secure attachment.

SUMMARY OF THE INVENTION

The present invention resides in a clip that includes a hook and a rotating clamp with a cam edge. The clamp is rotatable between two positions, one in which the cam edge is retracted from the hook opening so that a pole or cable can be inserted into the hook, and the other in which the cam edge is advanced toward the hook opening, partially closing it and pressing the pole or cable into the hook. The former may conveniently be referred to as the "open" or "non-clamping" position, while the latter may be referred to as the "clamping" position. In certain embodiments of the invention, the clamp has a sloping surface that forms a guide that tapers toward the opening when the clamp is in the open position and thereby facilitates the insertion of the pole or cable into the hook. When the clamp in these embodiments is rotated into the clamping position, the slope tapers in the opposite direction, away from the hook opening, thereby no longer serving as a guide toward the hook opening but instead helping to prevent the escape of the pole or cable from the hook. Also in certain embodiments of the invention, the clamp is biased toward the clamping and open positions such that once it is in either of these positions, it encounters relatively high resistance to rotation and thereby tends to remain in the position without being inadvertently shifted to the other position of to a position that is intermediate between the two.

These and other objects, features and advantages of the invention are discussed in detail below.

DETAILED DESCRIPTION OF THE INVENTION AND SPECIFIC EMBODIMENTS

Figure 2:
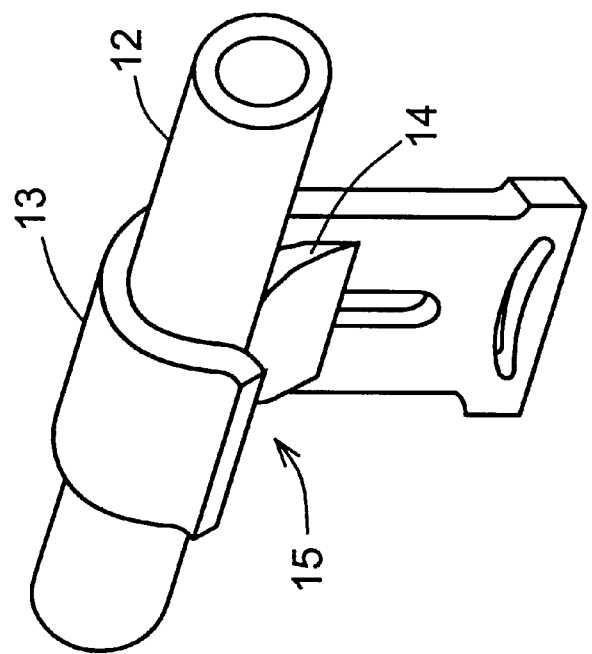
FIG. 2 is a perspective view of the clip and pole of FIG. 1, with the pole inserted in and engage by the clip.

While this invention is susceptible to a wide range of implementations and embodiments, an understanding of its basic elements is readily achieved by the following, which is a detailed description of the particular embodiments that are shown in the drawings.

Figure 1:
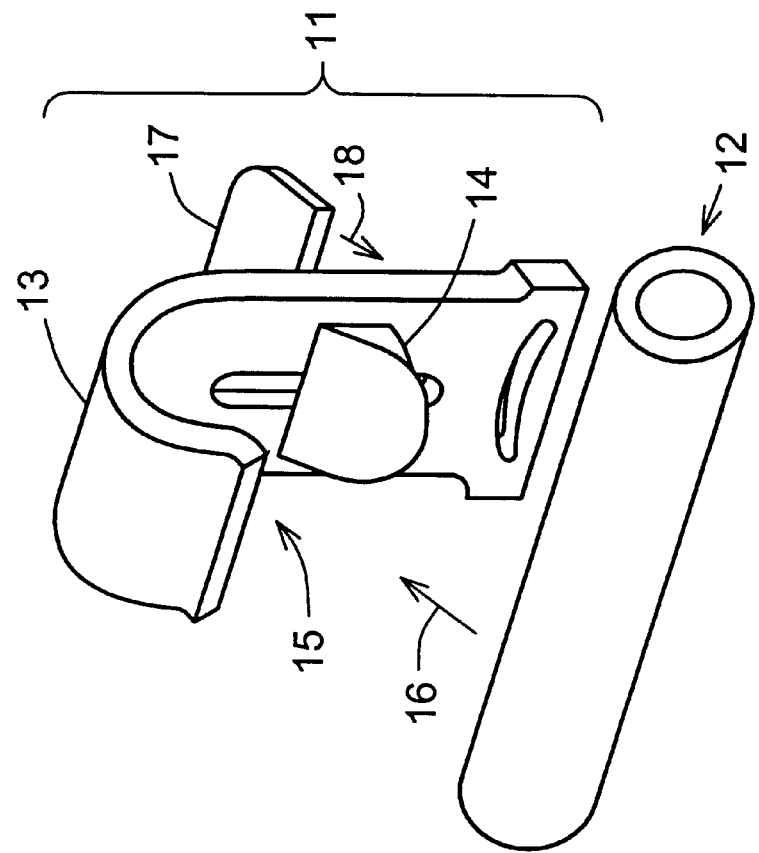
FIG. 1 is a perspective view of one example of a clip in accordance with this invention, with a pole poised to be inserted into the clip.

FIG. 1 shows a clip 11 in accordance with this invention, together with a pole 12 that is poised to be inserted into the clip, but not yet inserted. The clip is constructed in two parts—a hook portion 13 and a clamping member 14. The clamping member is shown in an open position which permits the pole 12 to be inserted into the hook through the hook opening 15. Insertion is done laterally relative to the axis of the pole (i.e., in the direction of the arrow 16) rather than longitudinally. A thumb key 17 extends from the back of the clamping member 14 to be grasped by the thumb and forefinger of the operator. By rotating the thumb key 17 in the direction of the arrow 18 (or in the opposite direction), one can turn the entire clamping member from the open position shown in FIG. 1 to the clamping position shown in FIG. 2. If this is done after the pole 12 is inserted into the hook opening 15, the forward portion of the clamping member 14, by virtue of its shape, will partially or fully close the hook opening 15 and thereby prevent the pole or cable from escaping.

Figure 3A:
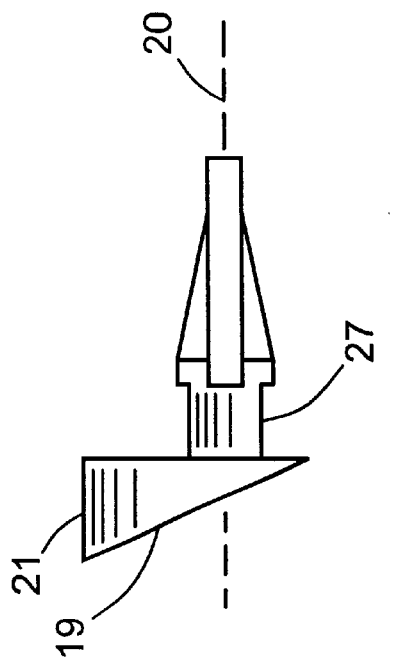
FIGS. 3a, 3b, and 3c are two side views and an end view, respectively, of the clamp portion of the clip of FIGS. 1 and 2.
Figure 3B:
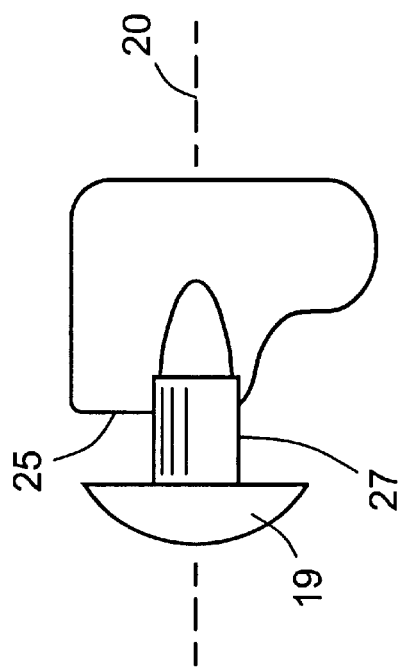
Figure 3C:
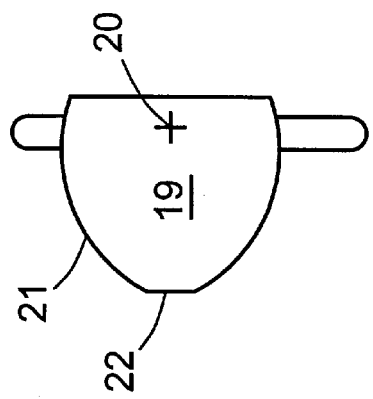

FIGS. 3a and 3b depict the clamping member 14 in side views, the view in FIG. 3b being rotated 90° relative to the view in FIG. 3a. FIG. 3c is an end view of the clamping member. The clamping end of the clamping member is a projection that has a sloping surface 19. As evident from the perspective views of FIGS. 1 and 2, the sloping surface 19 can serve as a guide for the insertion of the pole when the clamping member is oriented as in FIG. 1, in which the sloping surface is tapered toward the hook opening 15. When the clamping member is turned so that the sloping surface is tapered in the opposite direction, the thicker edge of the clamping member holds the pole or cable in place. The edge of the sloping surface is a cam edge 21 whose distance from the axis of rotation 20 of the clamping member varies with the angle of rotation. The term "cam edge" is used herein in its conventional meaning, i.e., to indicate an edge of a rotating component that translates the rotational motion of the component into linear motion of anything pressing against the outer edge of the component. The curvature of the cam edge in this particular embodiment is evident from the view in FIG. 3c. The curvature preferably forms part of a circle that is eccentrically oriented relative to the axis of rotation 20. When the clamping member is rotated to the clamping position, the cam edge pushes the pole or cable into the hook opening. In a particularly preferred embodiment of this invention, the cam edge has a flat segment 22, visible in FIG. 3c, at the location that contacts the pole or cable when the clamping member is fully in the clamping position. This flat segment stabilizes the clamping member in the clamping position.

Figure 4C:
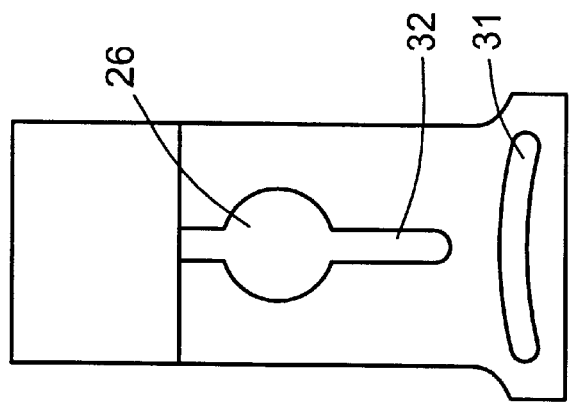
FIGS. 4a, 4b, and 4c are side, back, and front views, respectively, of the hook portion of the clip of FIGS. 1 and 2.
Figure 4B:
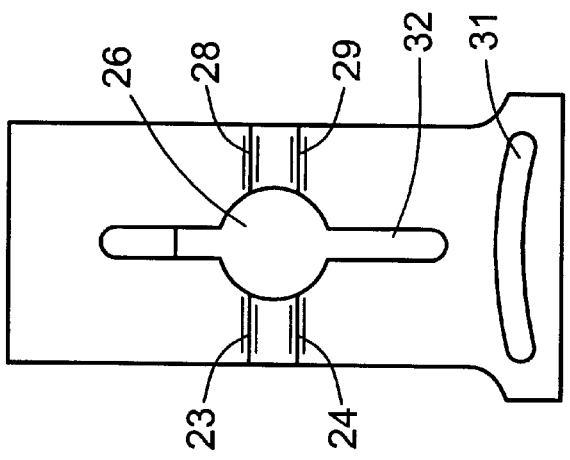
Figure 4A:
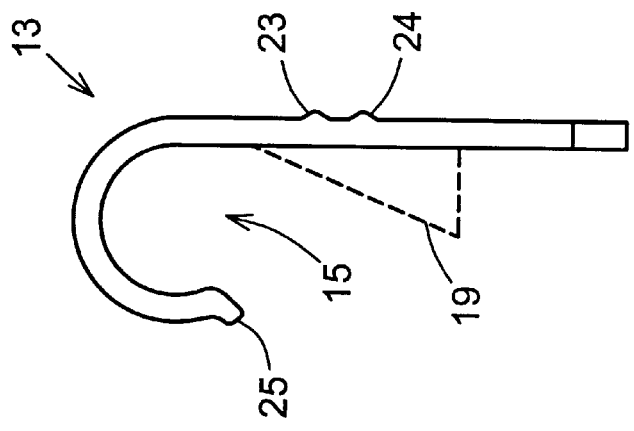

Further insight into the construction and operation of the clip of FIGS. 1, 2, 3a, 3b, and 3c can be gained from the three views of the hook member in FIGS. 4a, 4b, and 4c. The side view of FIG. 4a shows the hook opening 15 as well as a lip 25 at the edge of the hook. The lip 25 can be grasped by the user's thumb to urge the hook further open as a means of releasing a pole or cable that is closely fitted within the hook. FIG. 4a also shows, in dashed lines, the clamping end of the clamping member, turned so that the sloping surface 19 is in the open position (as in FIG. 1), guiding the pole or cable through the hook opening. Also shown in FIG. 4a are a pair of stops 23, 24, in the form of parallel raised ridges, to engage the thumb key 17 at an inner edge 25 of the key. These stops are also visible in the rear view of the hook member shown in FIG. 4b, which also shows the aperture 26 through which the neck 27 of the clamp member 14 (FIGS. 3a and 3b) passes and rotates. Further stops 28, 29 are included on the opposite side of the aperture. The contact edge 25 (FIG. 3a) fits between each pair of stops, the stops thus biasing the clamping member into the particular angle of rotation in which the contact edge and the stops are thus engaged. With a separate pair of stops on both sides of the aperture 26, the clamping member has two such stable positions, one in which the sloping surface is in the open position as shown in FIG. 1 and the other in which the sloping surface is in the clamping position as shown in FIG. 2.

A further feature of the hook member 13, as seen in both FIGS. 4b and 4c, is a loop or slot 31 for attachment of the object which the clip secures to the pole or cable. Any alternative to a loop or slot can be used, such as a hook, a rivet, a snap, or adhesive. In the case of a tent, canopy, or banner, the slot shown in the Figure will receive a loop, web, hook, or clip affixed to the fabric. The method by which the fabric is affixed to the slot may be permanent or removable.

A still further feature of the hook member 13, again as seen in both FIGS. 4b and 4c, is a vertical slot 32 for insertion of the thumb key, as a convenient means of joining the hook member to the clamping member to assemble the clip from its component parts.

Figure 5B:
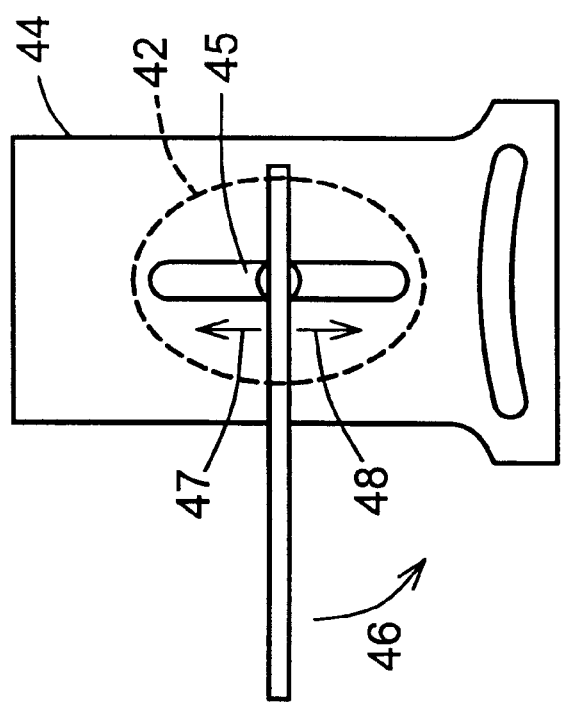
FIGS. 5a and 5b are perspective and rear views, respectively, of a second example of a clip in accordance with this invention.
Figure 5A:
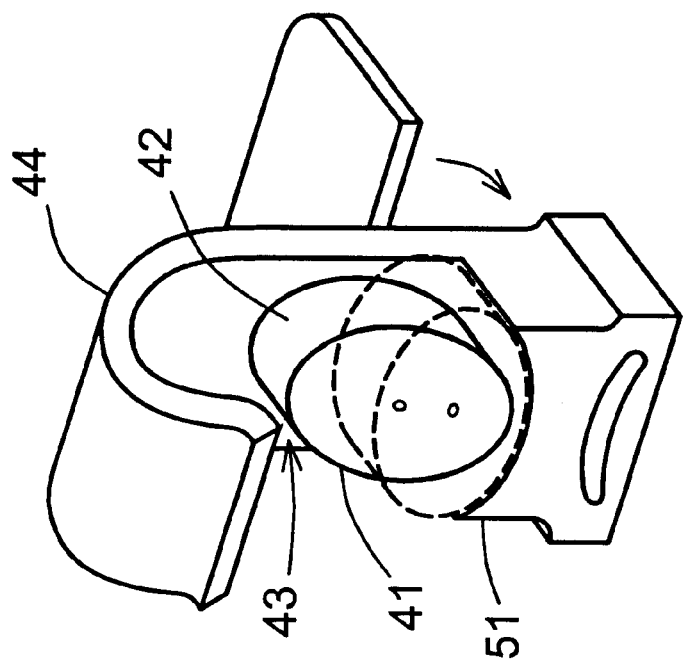

An alternative embodiment of the clip of this invention is shown in FIGS. 5a and 5b. The clamping member 41 of the clip of these Figures does not have a sloped surface and therefore no taper to serve as a guide for insertion of the pole or cable into the hook opening. The clamping member is oval or elliptical in shape, however, so that its edge 42 serves as a cam edge with two clamping positions (180° apart) at each end of the longer of its two axes and two open positions (also 180° apart) at each end of the shorter axis. The view in FIG. 5a shows the long axis of the ellipse in a vertical orientation in solid lines, partially closing the hook opening 43. FIG 5a also shows, in dashed lines, the clamping member rotated so that the short axis of the ellipse is in the vertical orientation, allowing greater clearance at the hook opening for insertion of the pole of cable. As seen from the rear view of FIG. 5b, the clamping member is mounted to the hook member 44 through a vertical slot 45 which permits vertical movement of the clamping member relative to the hook member. The clamping member is thus capable of rotation in the direction of the curved arrow 46, and of linear movement in the direction of the vertical arrows 47, 48. On the front side of the hook member 44 (visible in FIG. 5a) is a stop 51 which serves as a lower limit for the range of vertical movement of the clamping member. When the clamping member is rotated to the clamping position as shown in FIG. 5a, the stop forces the clamping member toward the hook opening and against the pole or cable.

Figure 7:
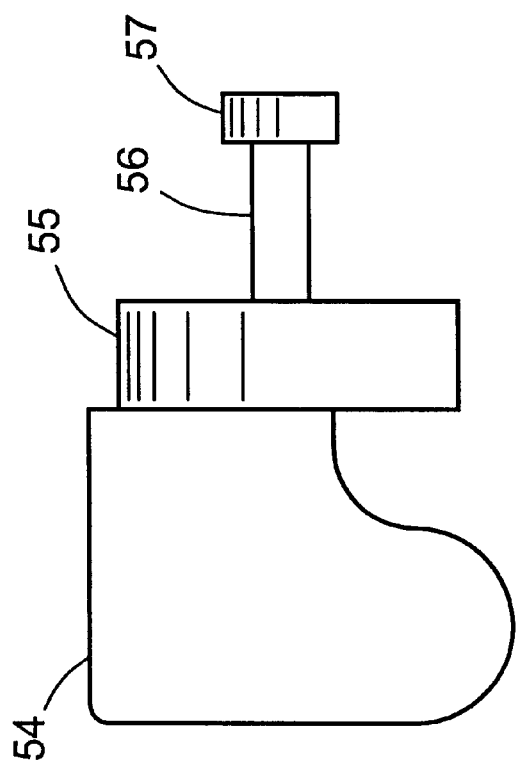
FIG. 7 is a side view of an alternative structure that can be used as the clamp portion of the clip of FIGS. 5a and 5b.
Figure 6:
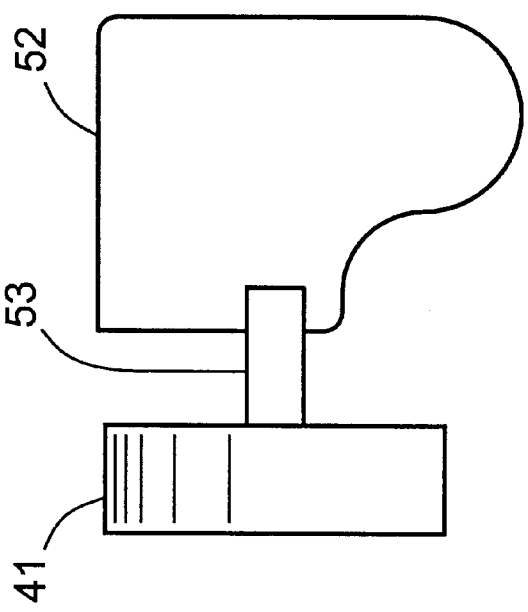
FIG. 6 is a side view of the clamp portion of the clip of FIGS. 5a and 5b.

FIG. 6 is a side view of the clamping member 41 of FIGS. 5a and 5b. Like the clamping member of FIGS. 3a and 3b, the clamping member 41 has a thumb key 52 which operates in the same manner as its counterpart in FIGS. 3a and 3b. The thumb key 52 is joined to the elliptical portion of the clamping member by a neck 53 which passes through an opening in the hook member, placing the thumb key 52 at the back of the hook member (the side opposite the side containing the hook opening). An alternative structure is shown in FIG. 7, in which the thumb key 54 is attached to the front of the elliptical portion of the clamping member and is thus grasped from the front of the hook member. The elliptical portion 55 is joined to a neck 56 which passes through the hook member and terminates in a flange 57 which holds the clamping member in the hook member.

The terms "pole" and "cable" are used above as illustrations. The invention is applicable to elongate supports in general, the term "elongate support" being used herein to denote any rigid or flexible support, including (but not limited to) rods, shafts, posts, dowels, batons, stakes, wires, ropes, and chains. The objects to be attached to such supports by use of the clip of this invention may include (but are not limited to) fabric items such as tents, canopies, banners, and awnings, as well as non-fabric items such as signs, lighting fixtures and speakers. A single support may contain two or more clips in accordance with this invention. Furthermore, in each of the embodiments shown in the drawings and described above, the hook may accommodate two or more poles or cables rather than just one.

The foregoing descriptions are offered primarily for purposes of illustrations. Further modifications, variations, applications, and implementations that utilize the basic elements of the invention and fall within its scope will be apparent to those skilled in the art.

What is claimed is:

1. A clip for securing an object to an elongate support at a selected location along the length of said support, said clip comprising:
    a hook member having an opening to receive an elongate support;
    a clamping member attached to said hook member adjacent to said opening, said clamping member having a cam edge and being rotatable between a non-clamping position in which said cam edge is retracted from said opening and a clamping position in which said cam edge is advanced toward said opening to partially close said opening; and
    means for attachment of an object to said hook member at a location other than said opening.

2. A clip in accordance with claim 1 in which said clamping member has a wedge-shaped profile with sloping surface which tapers toward said opening when said clamping member is in said non-clamping position and which tapers away from said opening when said clamping member is in said clamping position.

3. A clip in accordance with claim 1 in which said clamping member has a non-tapering profile.

4. A clip in accordance with claim 1 in which said clamping member has a non-tapering profile and is approximately elliptical in shape.

5. A clip in accordance with claim 4 in which said clamping member is slidably, in addition to rotationally, attached to said hook member, for sliding toward and away from said opening, and said clip further comprises stop means on said hook member for preventing said cam edge from being retracted from said opening when said clamping member is in said clamping position.

6. A clip in accordance with claim 1 further comprising means for grasping said clamping member to facilitate rotation thereof.

7. A clip in accordance with claim 6 in which grasping means is a finger tab mounted to said clamping member.

8. A clip in accordance with claim 7 in which said hook member has a front side on which said opening resides and a back side opposite said front side, and said finger tab extends through said hook member to protrude from said back side.

9. A clip in accordance with claim 7 in which said finger tab is arranged to be grasped from the same side of said hook member as said opening.

10. A clip in accordance with claim 1 in which said clamping member is biased toward each of said non-clamping and clamping positions.

11. A clip in accordance with claim 1 in which said means for attachment of an object to said hook member is a loop for insertion of a web.

12. A combination of an elongate support and a clip for securing an object to said elongate support, said combination comprising:

an elongate support; and a clip comprising:
  a hook member having an opening to receive an elongate support;
  a clamping member attached to said hook member adjacent to said opening, said clamping member having a cam edge and being rotatable between a non-clamping position in which said cam edge is retracted from said opening and a clamping position in which said cam edge is advanced toward said opening to partially close said opening; and
means for attachment of an object to said hook member at a location other than said opening.

13. A combination in accordance with claim 12 in which said elongate support member is a rigid pole.

14. A combination in accordance with claim 12 in which said elongate support member is a flexible cable.

15. A combination in accordance with claim 12 in which said clamping member has a wedge-shaped profile with sloping surface which tapers toward said opening when said clamping member is in said non-clamping position and which tapers away from said opening when said clamping member is in said clamping position.

16. A combination in accordance with claim 12 in which said clamping member has a non-tapering profile.

17. A combination in accordance with claim 12 in which said clamping member has a non-tapering profile and is approximately elliptical in shape.

18. A combination in accordance with claim 17 in which said clamping member is slidably, in addition to rotationally, attached to said hook member, for sliding toward and away from said opening, and said clip further comprises stop means on said hook member for preventing said cam edge from being retracted from said opening when said clamping member is in said clamping position.

19. A combination in accordance with claim 12 further comprising means for grasping said clamping member to facilitate rotation thereof.

20. A combination in accordance with claim 12 in which said clamping member is biased toward each of said non-clamping and clamping positions.

21. A combination in accordance with claim 12 in which said means for attachment of an object to said hook member is a loop for insertion of a web.

* * * * *